United States Patent
Tseng

[11] Patent Number: 5,887,888
[45] Date of Patent: Mar. 30, 1999

[54] COMBINED CART AND CHAIR ASSEMBLY

[76] Inventor: Chuen-Shyan Tseng, No. 3, Ting-Hsi-Hsin, Lu-Man Tsun, Chu-Chi, Hsiang, Chiayi Hsien, Taiwan

[21] Appl. No.: 922,739

[22] Filed: Sep. 3, 1997

[51] Int. Cl.[6] ........................................... B62B 9/12
[52] U.S. Cl. ............... 280/644; 297/188.03; 297/188.04; 297/188.05; 297/58
[58] Field of Search .................... 297/188.03, 188.04, 297/188.05, 58; D32/36; 280/644; 224/409, 411, 427, 432, 433, 586

[56] References Cited

U.S. PATENT DOCUMENTS

| 4,763,919 | 8/1988 | Nakao et al. | 280/644 |
| 5,484,090 | 1/1996 | Lyshkov | 224/40 |

FOREIGN PATENT DOCUMENTS

| 1211037 | 9/1917 | France | 297/58 |

*Primary Examiner*—D. Glenn Dayoan
*Assistant Examiner*—Clovia Hamilton

*Attorney, Agent, or Firm*—Brinks Hoffer Gilson & Lione

[57] ABSTRACT

A combined cart and chair assembly includes a front support, a seat frame, a rear leg frame, a container retaining frame, and a container. The front support has a handled upper section and a wheeled lower section. The seat frame is mounted pivotally to the front support between the upper and lower sections. The seat frame is foldable rearwardly and is stretchable forwardly. The rear leg frame has a top end mounted pivotally to the front support between the upper and lower sections above the seat frame so as to extend downwardly and rearwardly from the front support when the seat frame is stretched. The rear leg frame is pivoted to the seat frame and is foldable toward the wheeled lower section. The container retaining frame is provided behind the seat frame and is mounted pivotally to the front support above the top end of the rear leg frame for turning away from or toward the front support. The container retaining frame is pivoted to the seat frame and is movable toward the front support when the seat frame is folded. The container is mounted to the container retaining frame.

3 Claims, 6 Drawing Sheets

COMBINED CART AND CHAIR ASSEMBLY

BACKGROUND OF THE INVENTION

1. Field of the Invention

The present invention relates to a combined cart and chair assembly which can be used as a cart for transporting items or as a chair for seating as desired.

2. Description of the Related Art

Conventionally, a cart is popular for use in a shopping mall or a supermarket to facilitate carrying of items purchased by a person. When the shopping mall or the supermarket is relatively large, and since one may take a relatively long period of time to finish his or her shopping, chairs are usually needed to provide a place for resting. There is thus a need for a combined cart and chair assembly which has the functions of providing a seat and transporting items.

SUMMARY OF THE INVENTION

The main object of the present invention is to provide a combined cart and chair assembly which can be used selectively as a cart or as a chair, and which can be folded into a structure that occupies a relatively small amount of storage space.

Accordingly, the combined cart and chair assembly of the present invention includes a front support, a seat frame, a rear leg frame, a container retaining frame, and a container. The front support has a handled upper section and a wheeled lower section. The seat frame is mounted pivotally to the front support between the upper and lower sections. The seat frame is foldable rearwardly and is stretchable forwardly. The rear leg frame has a top end mounted pivotally to the front support between the upper and lower sections above the seat frame so as to extend downwardly and rearwardly from the front support when the seat frame is stretched. The rear leg frame is pivoted to the seat frame and is foldable toward the wheeled lower section. The container retaining frame is provided behind the seat frame and is mounted pivotally to the front support above the top end of the rear leg frame for turning away from or toward the front support. The container retaining frame is pivoted to the seat frame and is movable toward the front support when the seat frame is folded. The container is mounted to the container retaining frame.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
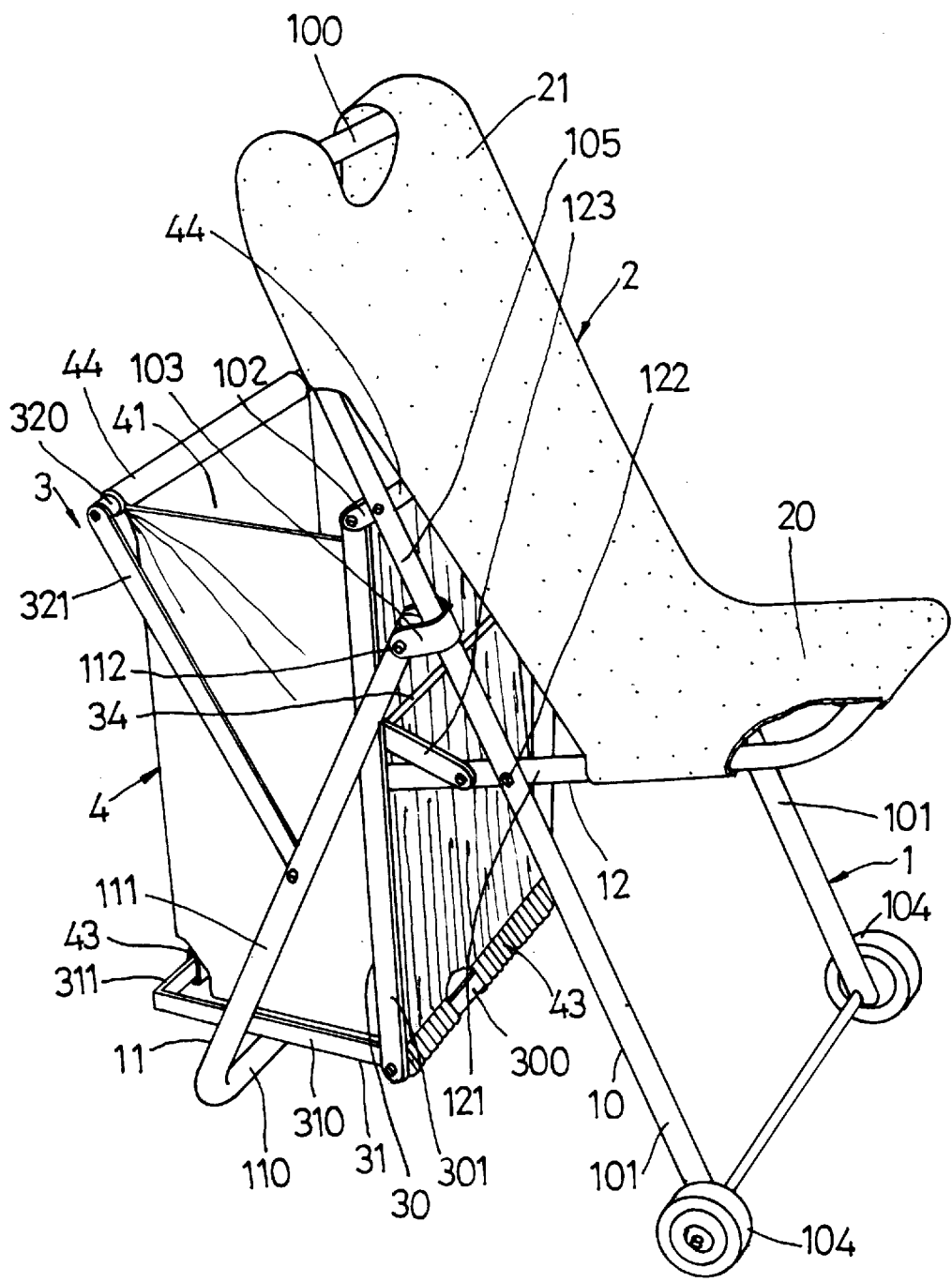
FIG. 1 is a perspective view illustrating the combined cart and chair assembly according to the preferred embodiment of the present invention.
Figure 2:
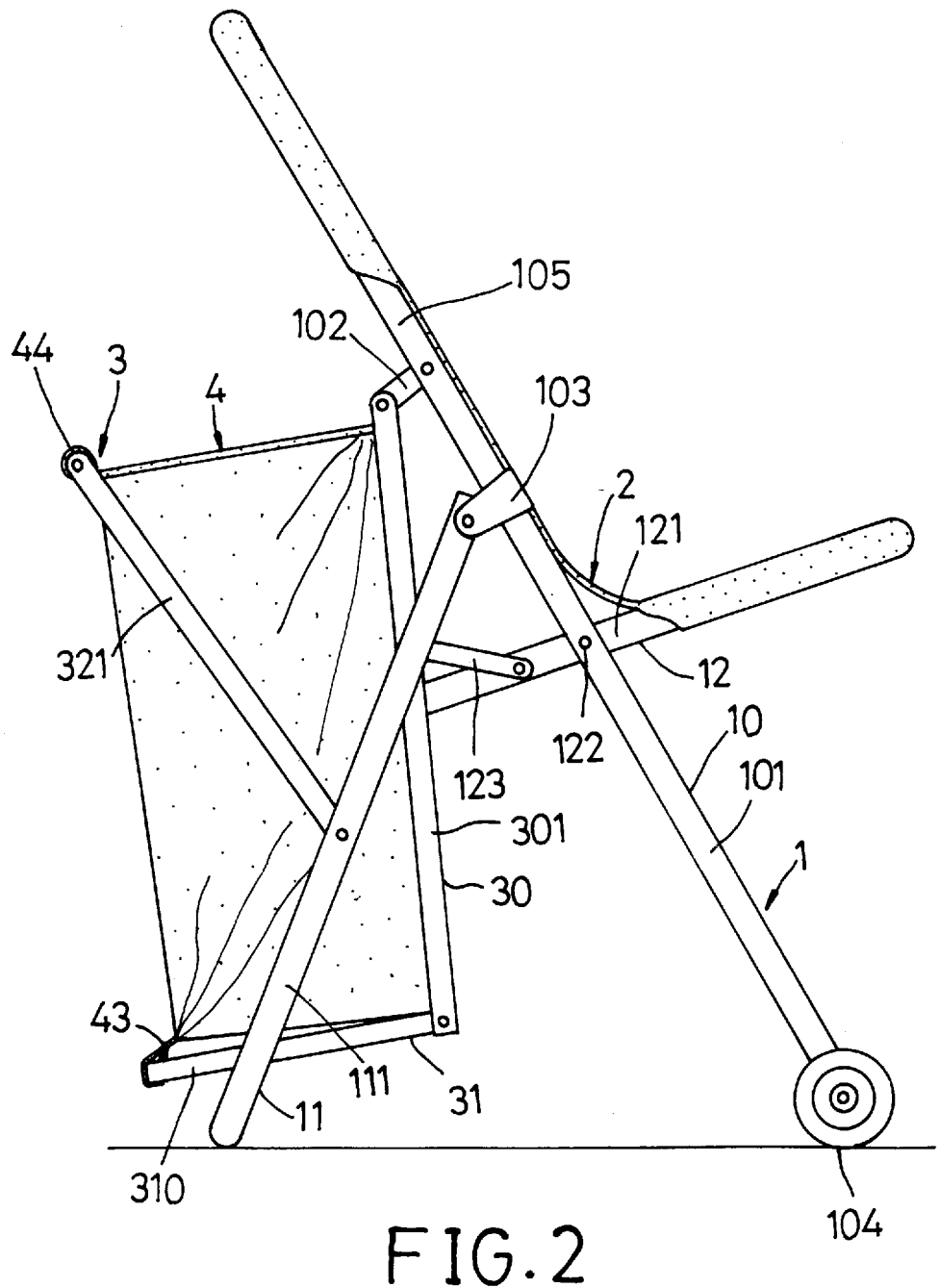
FIG. 2 is a side view of the combined cart and chair assembly of the preferred embodiment.
Figure 3:
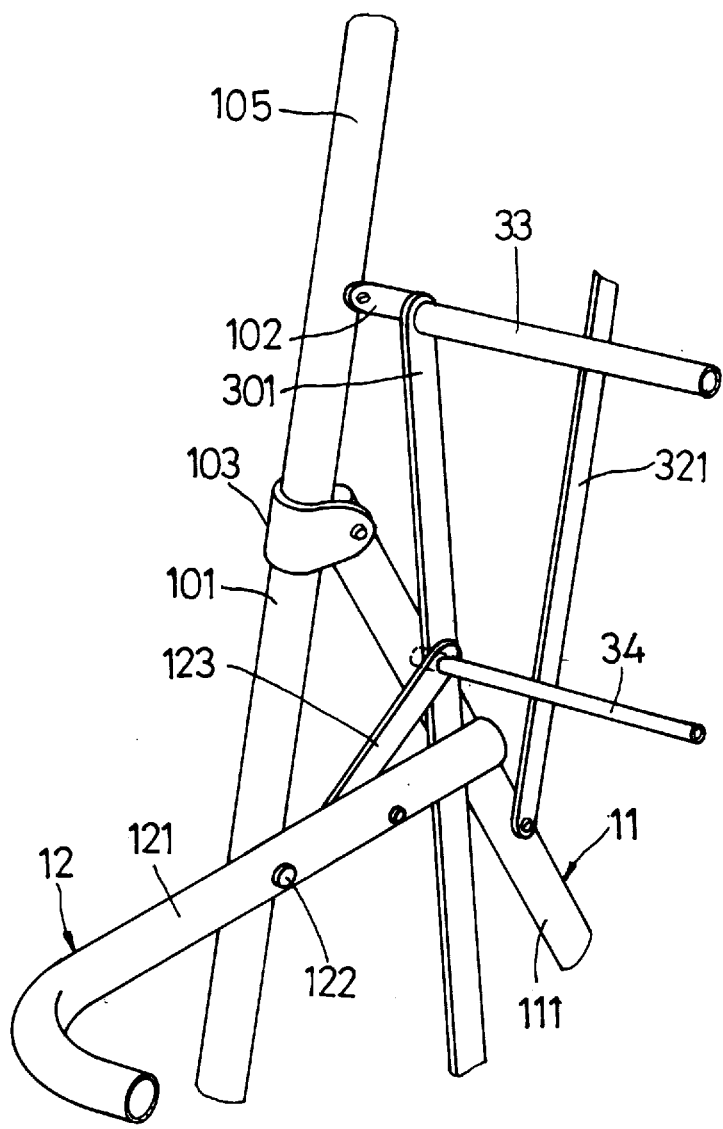
FIG. 3 is a perspective view illustrating a part of the combined cart and chair assembly of the preferred embodiment.

Referring to FIGS. 1, 2 and 3, the combined cart and chair assembly according to the preferred embodiment of the present invention is shown to include a front support 1, a seat frame 12, a rear leg frame 11, a container retaining frame 3 and a container 4.

The front support 1 includes two side posts 10, each of which has an upper section 105 and a lower section 101, a transverse bar 100 which extends between the upper sections 105, and a pair of wheels 104 provided at lower ends of the lower sections 101 to facilitate movement of the assembly.

The seat frame 12 is generally U-shaped and includes two lateral rails 121 mounted pivotally to the side posts 10 of the front support 1 between the upper sections 105 and the lower sections 101 by means of a pair of pivot shafts 122. The seat frame 12 is foldable rearwardly and is stretchable forwardly. A piece of cloth 2 is provided between the upper sections 105 of the side posts 10 and the lateral rails 121 of the seat frame 12 to form a backrest 21 and a seat 20.

The rear leg frame 11 has a generally U-shaped structure and includes a pair of lateral posts 111 and a bottom rail 110 which interconnects the lateral rods 111 and which is adapted to be supported on a ground surface. Each of the lateral rods 111 has a top end mounted pivotally to a respective one of the side posts 10 of the front support 1 between the upper and lower sections 105, 101 and above the seat frame 12 by means of a pair of pivot lobe members 103 and a pair of pivot shafts 112 so as to extend downwardly and rearwardly from the front support 1 when the seat frame 12 is stretched.

The container retaining frame 3 is provided behind the seat frame 12 and the front support 1, and includes a front frame portion 30 which has two longitudinal lateral rods 301 at two opposite sides thereof. Each of the lateral rods 301 has upper and lower ends. The container retaining frame 3 further has a pair of first connecting plates 102 and a pair of second connecting plates 123. Each of the first connecting plates 102 has a rear end mounted pivotally to the upper end of a respective one of the lateral rods 301, and a front end mounted pivotally to the upper section 105 of a respective one of the side posts 10 of the front support 1. Each of the second connecting plates 123 has a front end mounted pivotally to a respective one of the lateral rails 121 of the seat frame 12 behind the front support 1, and a rear end mounted pivotally to a respective one of the lateral rods 301 of the front frame portion 30 and a respective one of the lateral posts 111 of the rear leg frame 11. The container retaining frame 3 further has a U-shaped base frame portion 31 which includes two lateral parts 310 extending rearwardly from the lower ends of the longitudinal lateral rods 301 of the front frame portion 30, and a transverse part 311 interconnecting rear ends of the lateral parts 310. The lateral parts 310 of the base frame portion 31 are mounted pivotally to the lower ends of the lateral rods 301 of the front frame portion 30 so as to be foldable onto the front frame portion 30. As shown in FIG. 3, the front frame portion 30 further has a transverse rod 34 with two opposite ends, each of which passes through the respective one of the second connecting plates 123 and the respective one of the longitudinal lateral rods 301 and is attached to a respective one of the lateral posts 111 of the rear leg frame 11. The container retaining frame 3 further has a front retaining rail 33 which extends between the upper ends of the longitudinal lateral rods 301, and a base retaining rail 300 (see FIG. 1) which extends between the lower ends of the longitudinal lateral rods 301. Referring again to FIGS. 1 and 2, the container retaining frame 3 further has a pair of rearwardly and upwardly extendible side arms 321 which have lower ends mounted pivotally to the lateral posts 111 of the rear leg frame 11, and upper ends. A rear retaining rail 320 is provided to interconnect the upper ends of the side arms 321.

The container 4 is in the form of a bag with an upper open end 44 that defines an opening 41. The container 4 is mounted to the container retaining frame 3 such that the upper open end 44 is retained at the front and rear retaining rails 33, 320, and such that a lower portion 43 thereof is retained at the base retaining rail 300 and the base frame portion 31.

Figure 4:
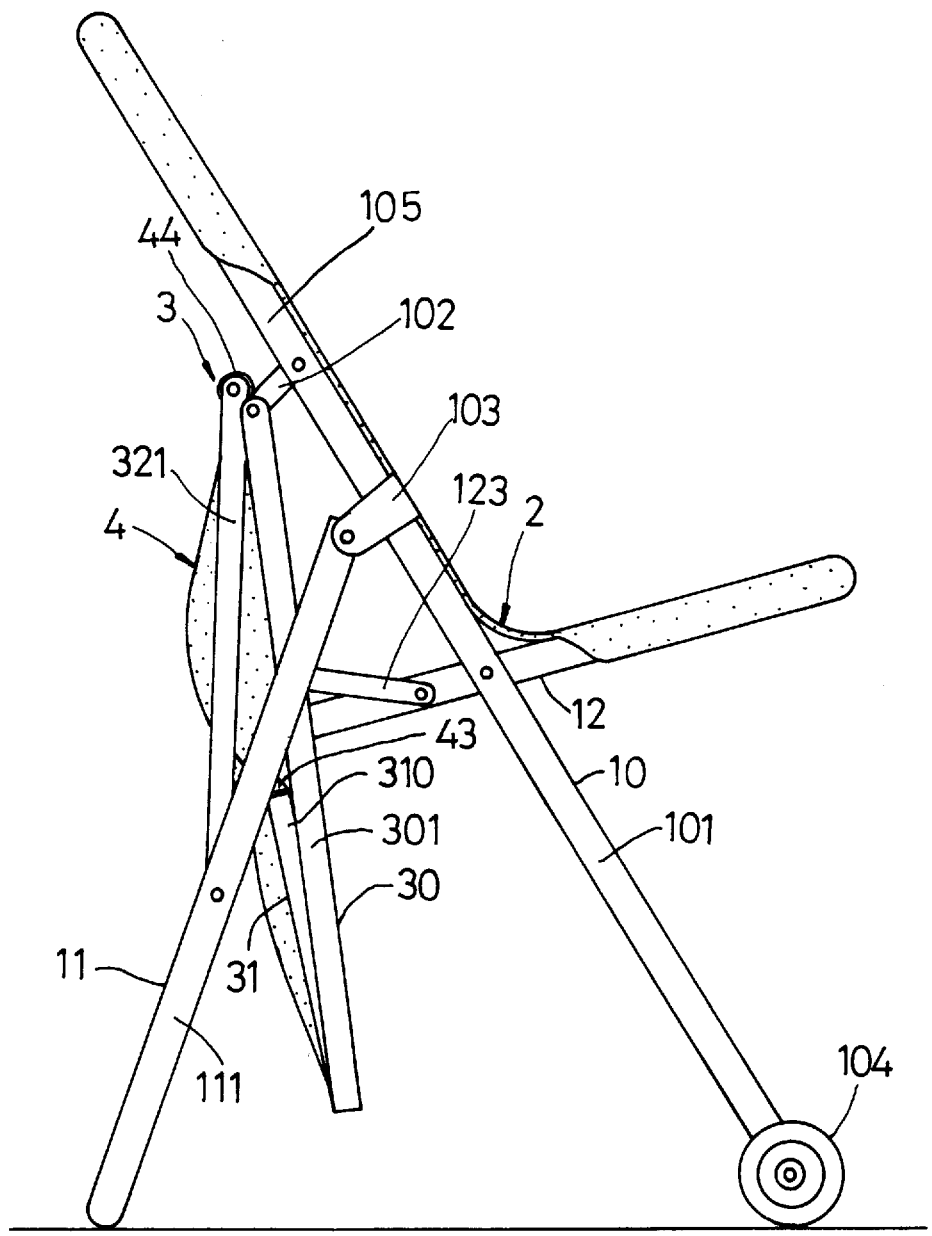
FIG. 4 is a side view of the preferred embodiment when a container retaining frame thereof is folded.

Referring to FIGS. 2 and 4, when the assembly is used as a chair, the seat frame 12 is stretched forwardly for seating. If the container 4 is not needed in this situation, the container retaining frame 3 may be folded into the configuration shown in FIG. 4 by moving the base frame portion 31 and the side arms 321 pivotally and forwardly toward the front frame portion 30 of the container retaining frame 3.

Figure 5:
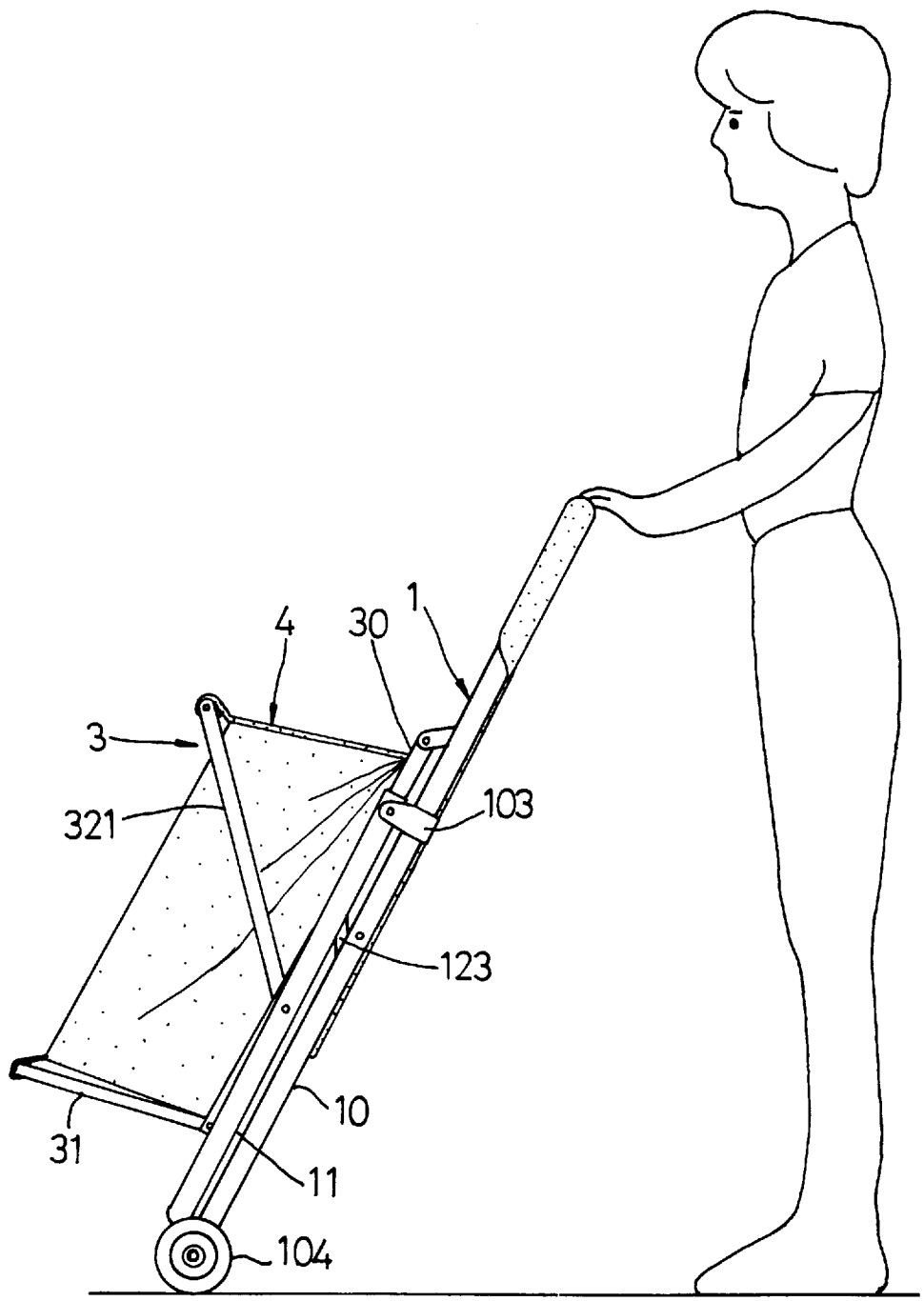
FIG. 5 illustrates the preferred embodiment when used as a cart.

Referring to FIGS. 1 and 5, when the assembly is to be used as a cart for transporting items, the container retaining frame 3 is unfolded for receiving the items in the container 4, the seat frame 12 is folded rearwardly onto the front support 1, and the rear leg frame 11 is moved forwardly and pivotally about the pivot lobe units 103 for folding onto the front support 1. The transverse bar 100 of the front support 1 can thus serve as a handle, and the assembly is movable with the assistance of the wheels 104 on the front support 1.

Figure 6:
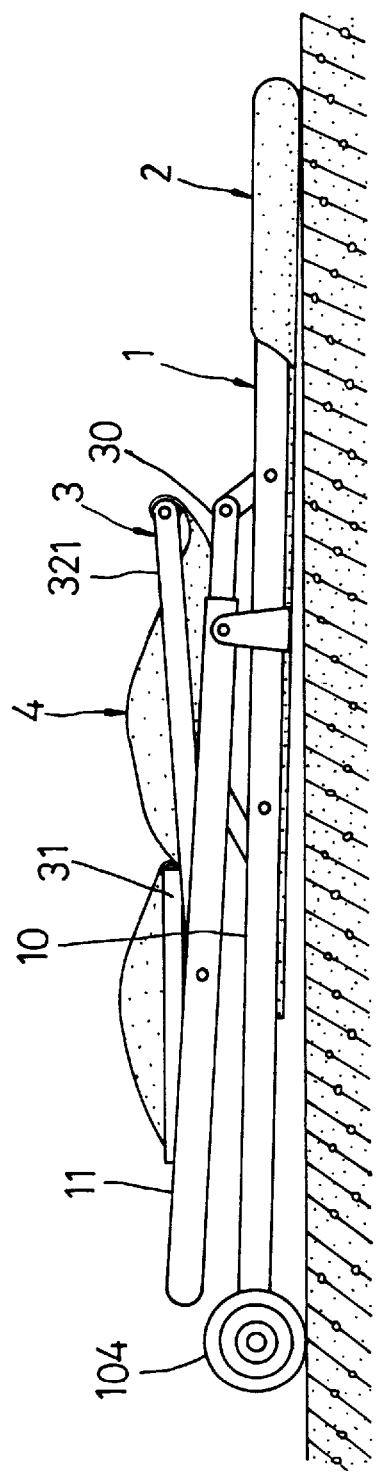
FIG. 6 illustrates the preferred embodiment when the entire assembly is folded.

When the assembly is not in use and is to be stored, the seat frame 12 is folded rearwardly onto the front support 1. The side arms 321 and the base frame portion 31 of the container retaining frame 3 are folded onto the front frame portion 30, which, in turn, is folded forwardly onto the front support 1 together with the rear leg frame 11. The entire assembly is thus formed as a folded configuration as shown in FIG. 6, which occupies a relatively small amount of space to facilitate storage.

It has thus been shown that the combined cart and chair assembly of the present invention achieves both the functions of a cart and a chair, and can be folded into a structure that occupies a relatively small amount of space to facilitate storage when it is not in use.

With this invention thus explained, it is apparent that numerous modifications and variations can be made without departing from the scope and spirit of this invention. It is therefore intended that this invention be limited only as indicated in the appended claims.

I claim:

1. A combined cart and chair assembly comprising:
   a front support having a handled upper section and a wheeled lower section;
   a seat frame mounted pivotally to said front support between said upper and lower sections, said seat frame being foldable rearwardly and stretchable forwardly;
   a rear leg frame which has a top end mounted pivotally to said front support between said upper and lower sections above said seat frame so as to extend downwardly and rearwardly from said front support when said seat frame is stretched, said rear leg frame being further pivoted to said seat frame and being foldable toward said wheeled lower section;
   a container retaining frame provided behind said seat frame and being mounted pivotally to said front support above said top end of said rear leg frame for turning away from or toward said front support, said container retaining frame being further pivoted to said seat frame and being movable toward said front support when said seat frame is folded; and
   a container mounted to said container retaining frame;
   wherein said container retaining frame comprises:
      a front frame portion with upper and lower ends and two opposite sides interconnecting said upper and lower ends;
      a pair of first connecting plates, each of which has a rear end mounted pivotally to said upper end of said front frame portion at one of said opposite sides, and a front end mounted pivotally to said front support; and
      a pair of second connecting plates having front ends mounted pivotally to said seat frame, and rear ends mounted pivotally to said front frame portion and said rear leg frame;
      wherein said container retaining frame further has a base frame portion extending rearwardly from said lower end of said front frame portion for retaining a lower portion of said container, said base frame portion having two lateral arms mounted pivotally to said front frame portion so as to be foldable onto said front frame portion.

2. A combined cart and chair assembly comprising:
   a front support having a handled upper section and a wheeled lower section;
   a seat frame mounted pivotally to said front support between said upper and lower sections, said seat frame being foldable rearwardly and stretchable forwardly;
   a rear leg frame which has a top end mounted pivotally to said front support between said upper and lower sections above said seat frame so as to extend downwardly and rearwardly from said front support when said seat frame is stretched, said rear leg frame being further pivoted to said seat frame and being foldable toward said wheeled lower section;
   a container retaining frame provided behind said seat frame and being mounted pivotally to said front support above said top end of said rear leg frame for turning away from or toward said front support, said container retaining frame being further pivoted to said seat frame and being movable toward said front support when said seat frame is folded; and
   a container mounted to said container retaining frame;
   wherein said container retaining frame comprises:
      a front frame portion with upper and lower ends and two opposite sides interconnecting said upper and lower ends;
      a pair of first connecting plates, each of which has a rear end mounted pivotally to said upper end of said front frame portion at one of said opposite sides, and a front end mounted pivotally to said front support; and
      a pair of second connecting plates having front ends mounted pivotally to said seat frame, and rear ends mounted pivotally to said front frame portion and said rear leg frame;
      wherein said front frame portion has, in said opposite sides, a pair of longitudinal lateral rods which are pivoted to said first and second connecting plates, respectively, and a transverse rod which has two opposite ends, each of which passes through the respective one of said second connecting plates and the respective one of said longitudinal lateral rods and is attached to said rear leg frame;
      wherein said upper end of said front frame portion of said container retaining frame has a front retaining rail extending between said longitudinal lateral rods.

3. The combined cart and chair assembly of claim 2, wherein said container retaining frame further has a pair of rearwardly and upwardly extendible side arms which have lower ends mounted pivotally to said rear leg frame, and upper ends, and a rear retaining rail which interconnects said upper ends of said side arms, said container being a bag with an upper open end, said front and rear retaining rails cooperatively retaining said upper open end of said bag.

* * * * *